United States Patent
Lin et al.

(10) Patent No.: US 11,209,309 B2
(45) Date of Patent: Dec. 28, 2021

(54) WEARABLE ULTRA-VIOLET PHOTOCHROMIC PASSIVE SENSORS

(71) Applicant: Board of Regents, The University of Texas System, Austin, TX (US)

(72) Inventors: Yirong Lin, El Paso, TX (US); Norman Love, El Paso, TX (US)

(73) Assignee: Board of Regents, The University of Texas System, Austin, TX (US)

(*) Notice: Subject to any disclaimer, the term of this patent is extended or adjusted under 35 U.S.C. 154(b) by 135 days.

(21) Appl. No.: 16/706,619

(22) Filed: Dec. 6, 2019

(65) Prior Publication Data

US 2020/0182689 A1   Jun. 11, 2020

Related U.S. Application Data

(60) Provisional application No. 62/776,773, filed on Dec. 7, 2018.

(51) Int. Cl.
   *G01J 1/42*   (2006.01)
   *G01J 1/02*   (2006.01)
   *G01J 1/50*   (2006.01)

(52) U.S. Cl.
   CPC ............ *G01J 1/429* (2013.01); *G01J 1/0233* (2013.01); *G01J 1/50* (2013.01); *G01J 2001/0257* (2013.01)

(58) Field of Classification Search
   CPC ................................ G01J 1/429; G01J 1/50
   See application file for complete search history.

(56) References Cited

U.S. PATENT DOCUMENTS

| 5,698,343 A | * | 12/1997 | Sutherland | ............... G01J 9/02 250/482.1 |
| 10,060,787 B2 | * | 8/2018 | Balooch | ............... G01J 1/0219 |
| 2003/0226978 A1 | * | 12/2003 | Ribi | ....................... A61Q 17/04 250/474.1 |
| 2020/0149960 A1 | * | 5/2020 | Foller | ...................... G01J 3/52 |

* cited by examiner

*Primary Examiner* — Yara B Green
(74) *Attorney, Agent, or Firm* — Yee & Associates, P.C.

(57) ABSTRACT

A wearable apparatus for indicating a threshold amount of ultra-violet (UV) light has been received by a user and method of making the same are provided. In an embodiment, a wearable apparatus includes a first material and a second material. The second material includes a color changing material that changes color from a first color to a second color when exposed to a threshold level of UV light. The wearable apparatus is configured to be worn by a user in a place exposed to sunlight. The second color indicates that the user has been exposed to a threshold amount of UV light.

20 Claims, 6 Drawing Sheets

FIGURE 3B

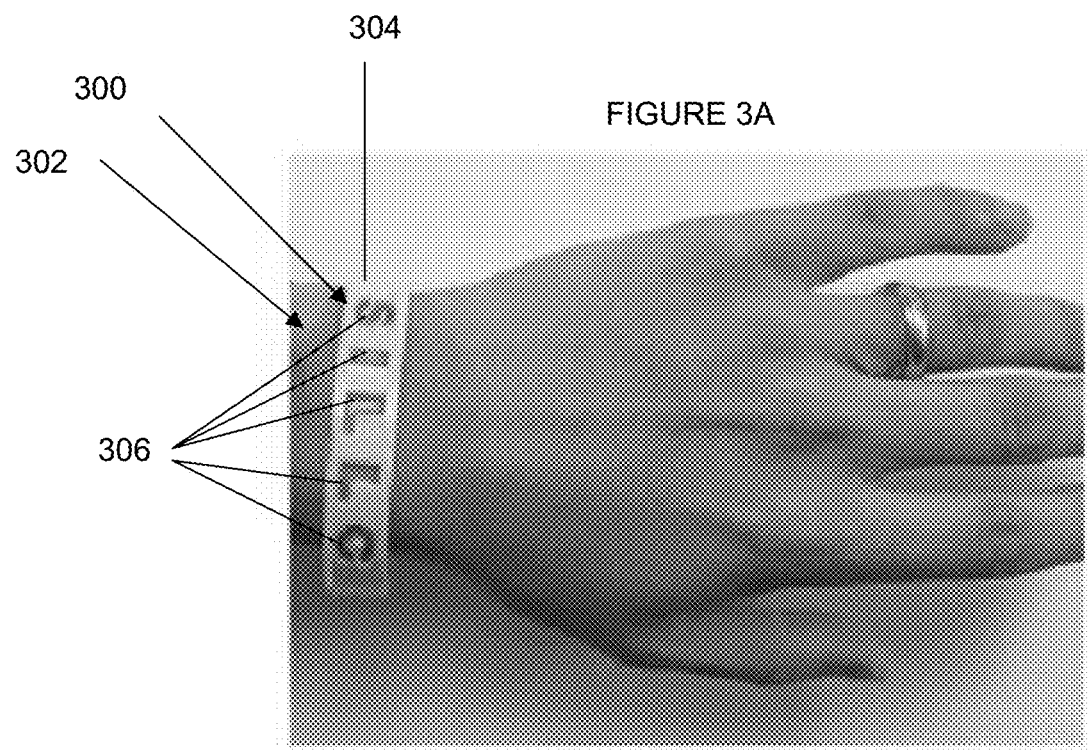
Before
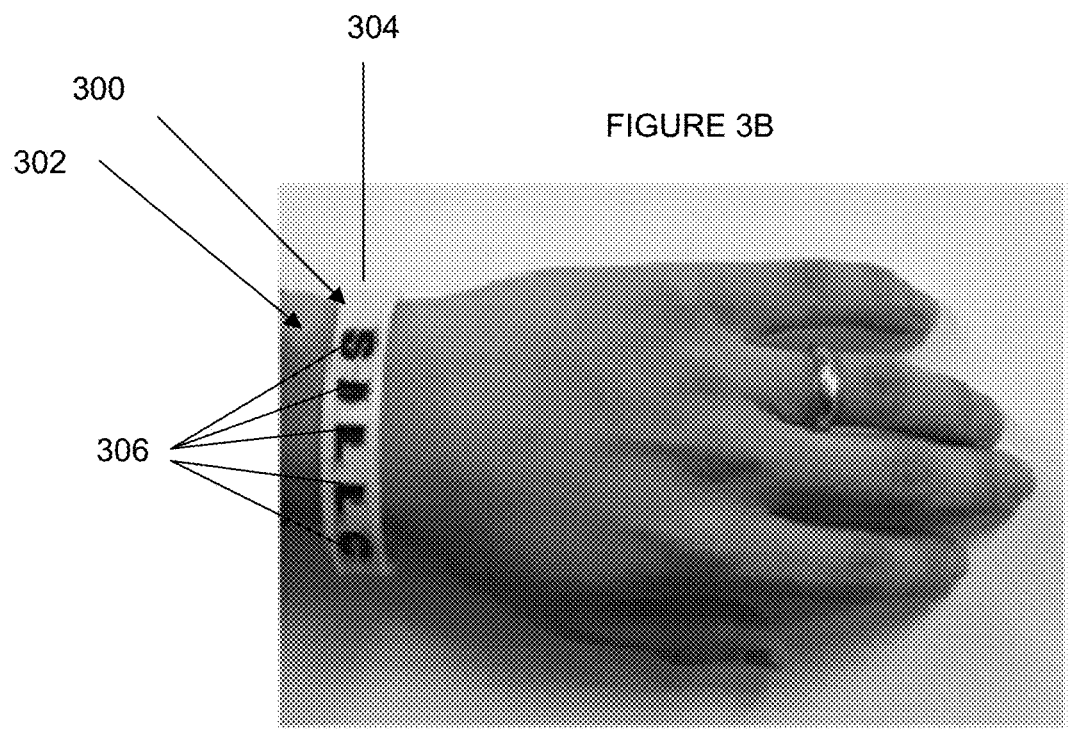
After

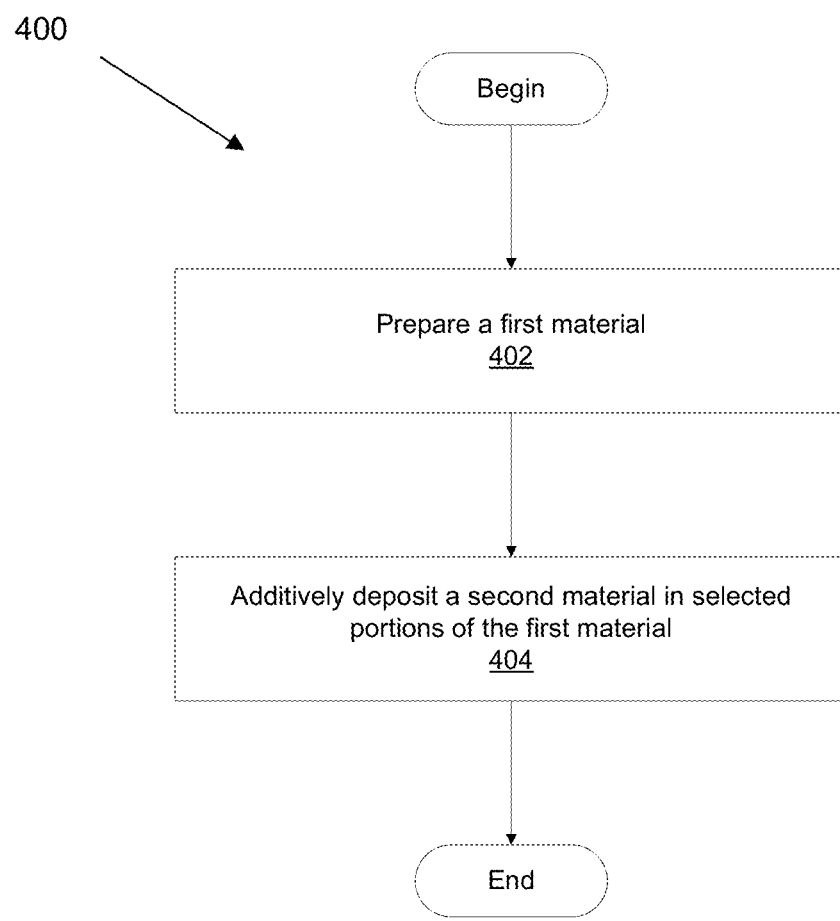

WEARABLE ULTRA-VIOLET PHOTOCHROMIC PASSIVE SENSORS

RELATED PROVISIONAL APPLICATION

This application claims the benefit of U.S. Provisional Patent Application Ser. No 62/776,773 filed Dec. 7, 2018, and entitled "Wearable Ultra-Violet Photochromic Passive Sensors."

BACKGROUND

The disclosure relates generally to ultra-violet (UV) detection sensors and to additive manufacturing techniques for fabricating UV detection sensors.

More people are diagnosed with skin cancer each year in the U.S. than all other cancers combined. UV from the sun is the major cause of skin cancer. 20% of Americans will develop skin cancer by the age of 70. The sun also contributes to skin damage. An estimated 90% of skin aging is caused by the sun. Sun damage is cumulative. People who use sunscreen (Sun Protection Factor (SPF) 15 or higher) daily show 24% less skin aging than those that don't use any. However, no wearable and affordable UV detection sensor currently exists on market.

SUMMARY

An embodiment of the present disclosure provides a wearable apparatus for indicating a threshold amount of ultra-violet (UV) light has been received by a user. The wearable device includes a first material and a second material. The second material includes a color changing material that changes color from a first color to a second color when exposed to a threshold level of UV light. The wearable apparatus is configured to be worn by a user in a place exposed to sunlight. The second color indicates that the user has been exposed to a threshold amount of UV light.

Another embodiment of the present disclosure provides a method for fabricating a wearable apparatus that indicates to a user when a threshold amount of ultra-violet (UV) light has been received by the user. The method includes preparing a first material. The method also includes additively depositing a second material in selected portions of the first material, wherein the second material comprises a color changing material that changes color from a first color to a second color when exposed to a threshold level of ultraviolet (UV) light, wherein the wearable apparatus is configured to be worn by a user in a place exposed to sunlight, and wherein the second color indicates that the user has been exposed to a threshold amount of UV light.

Yet another embodiment of the present disclosure provides a computer system for fabricating a wearable apparatus that indicates to a user when a threshold amount of ultra-violet (UV) light has been received by the user. The computer system includes a bus system; a storage device connected to the bus system, wherein the storage device stores program instructions, and a processor connected to the bus system. The processor executes the program instructions to cause an additive printing apparatus to prepare a first material. The processor further executes the program instruction to cause the additive printing apparatus to additively deposit a second material in selected portions of the first material, wherein the second material comprises a color changing material that changes color from a first color to a second color when exposed to a threshold level of ultraviolet (UV) light, wherein the wearable apparatus is configured to be worn by a user in a place exposed to sunlight, and wherein the second color indicates that the user has been exposed to a threshold amount of UV light.

BRIEF DESCRIPTION OF THE DRAWINGS

FIGS. 3A-3B show an example bracelet as worn on a user's wrist before and after exposure to UV light in accordance with an illustrative embodiment;

FIG. 4 is a flowchart of a method for fabricating a wearable apparatus that indicates to a user when a threshold amount of ultra-violet (UV) light has been received by the user in accordance with an illustrative embodiment;

DETAILED DESCRIPTION

Figure 1:
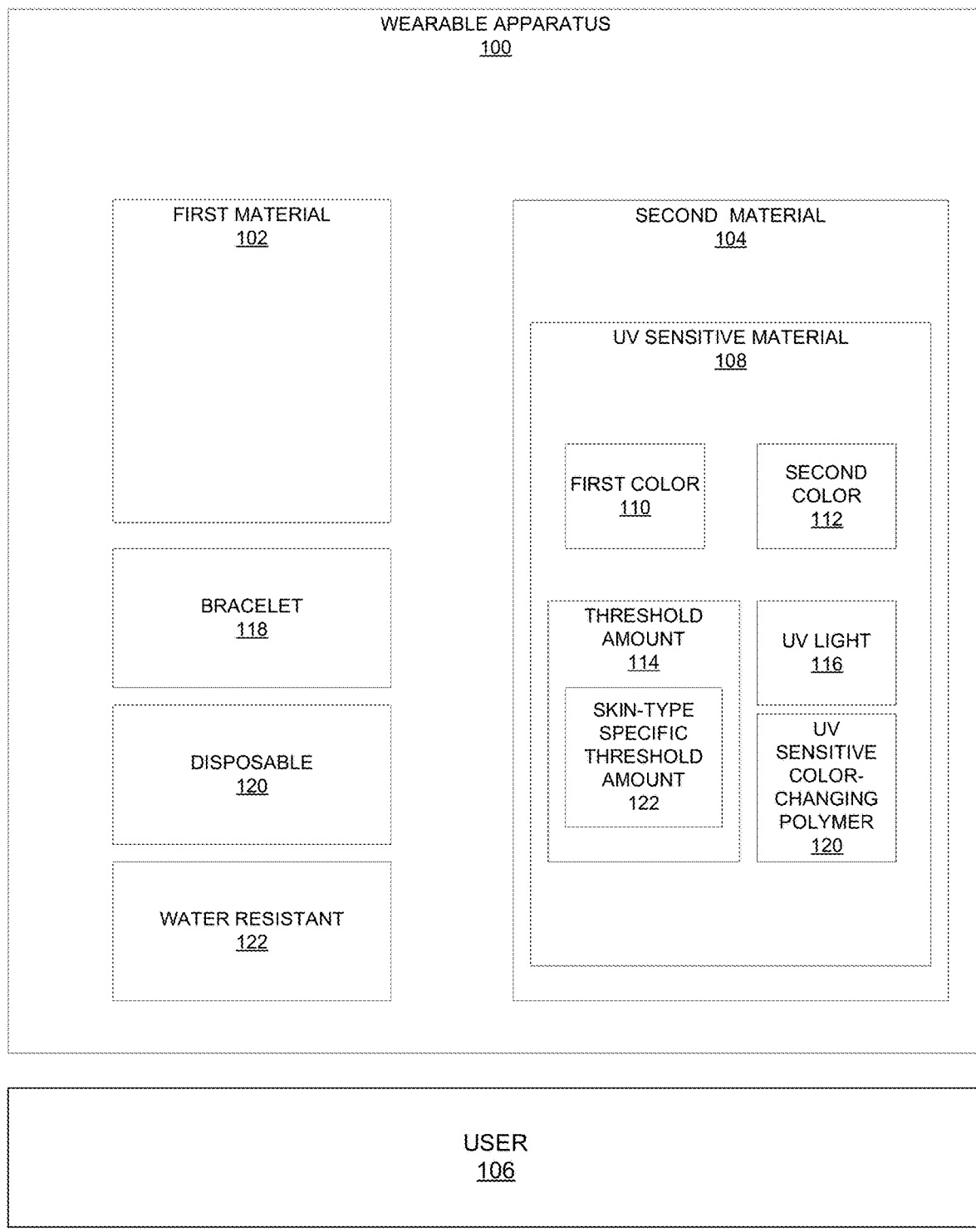
FIG. 1 is a block diagram of a wearable apparatus for providing an indication of how much UV light a user has received is depicted in accordance with an illustrative embodiment.

Aspects of the present invention are described herein with reference to diagrams of methods and apparatuses according to embodiments of the invention. The diagrams in the Figures illustrate the architecture and operation of possible implementation methods according to various embodiments of the present invention.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive.

Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

For purposes of the description hereinafter, the terms "upper," "lower," "right," "left," "vertical," "horizontal," "top," "bottom," and derivatives thereof shall relate to the embodiments of the disclosure, as it is oriented in the drawing figures. The terms "positioned on" means that a first element, such as a first structure, is present on a second element, such as a second structure, wherein intervening elements, such as an interface structure, e.g. interface layer, may be present between the first element and the second element.

In this disclosure, when an element, such as a layer, region, or substrate is referred to as being "on" or "over" another element, the element can be directly on the other element or intervening elements can also be present. In contrast, when an element is referred to as being "directly on," "directly over," or "on and in direct contact with" another element, there are no intervening elements present, and the element is in contact with another element.

As used herein, the phrase "at least one of", when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B and ten of item C; four of item B and seven of item C; or other suitable combinations.

As used herein, the terms "optimize", "optimization", and "optimizing" do not necessarily mean that the result is the very best possible result, but rather merely mean that an optimized value is a value the produces a desired result, the desired result possibly being a range of acceptable values or within a specified bound, or optimization may merely mean an improvement or change in a quality as compared with an unoptimized value. In an aspect, "optimizing" means tuning a variable such that a resulting property is within a range of acceptable resulting properties.

The illustrative embodiments recognize and take into account that excessive exposure to sunlight is a leading cause of cancer and premature aging. The illustrative embodiments further recognize and take into account that people sometimes find it difficult to determine when they have received a maximum amount of sun for a day. The illustrative embodiments further recognize and take into account that a simple, low cost method for determining how much sun a person has received is desirable.

Disclosed herein is an easy to use bracelet that changes color from, for example, orange to blue, after being exposed to the Environmental Protection Agency (EPA) daily recommended amount of UV (or some other predetermined amount of UV light). In an embodiment, unlike competitors, the color change is gradual, permanent and stops changing once daily recommended UV intake has been reached. In an illustrative embodiment, the wearable apparatus, such as a bracelet, is disposable, non-invasive, passive, and waterproof. In illustrative embodiments, the wearable apparatus does not require the use of expensive additional devices, such as smart phones, to determine whether a threshold amount of UV light has been received.

In an embodiment, an additive manufacturing process, such as by use of a three-dimensional (3D) printer is used to fabricate different customized bracelets that use a UV color changing polymer. The color change from a first color, for example, orange, to a second color, for example, blue, is gradual and calibrated using specialized UV measurement tools. The bracelet is designed to be correspondent with the UV Index.

Turning now to the Figures and, in particular, to FIG. 1, a block diagram of a wearable apparatus for providing an indication of how much UV light a user has received is depicted in accordance with an illustrative embodiment. Wearable apparatus 100 includes first material 102 and second material 104. Wearable apparatus 100 may also include other materials in addition to first material 102 and second material 104. In an illustrative embodiment, first material 102, individually or in combination with other materials and/or second material 104, provides a framework allowing the wearable apparatus to be worn by user 106. Second material 104 is UV sensitive material 108 that changes color from first color 110 to second color 112 when exposed to threshold amount 114 of UV light 116.

In an illustrative embodiment, wearable apparatus 100 is bracelet 118 designed to be worn, for example, on a user's wrist or ankle. In an illustrative embodiment, UV sensitive material 108 is UV sensitive color-changing polymer 120. In an illustrative embodiment, second material 104 is configured to stop changing color when second material has been exposed to threshold amount 114 of UV light 116. In an illustrative embodiment, second material 104 changes color gradually from first color 110 to second color 112. In an illustrative embodiment, second material 104 is determined such that threshold amount 114 of UV light 116 corresponds to skin-type specific threshold amount 122 of UV light 116. Thus, different ones of wearable apparatus 100 may be made to correspond to a specific skin-type. For example, a user with light or fair skin may have a lower threshold amount of UV light than a user with darker skin. The darker the skin, the higher the threshold amount of UV light may be. In an illustrative embodiment, threshold amount 114 may be determined according to an EPA daily recommended amount of UV light. The amount and/or type of material selected for second material 104 may be determined according to measurements of UV sensitivity such that second material 104 changes color to second color 112 when threshold amount 114 of UV light 116 has been reached. In an illustrative embodiment, wearable apparatus 100 is disposable 124 and/or water resistant 126. Wearable apparatus 100 may be designed such that prints can be made to spell different words and/or images with second material 104.

Figure 2A:
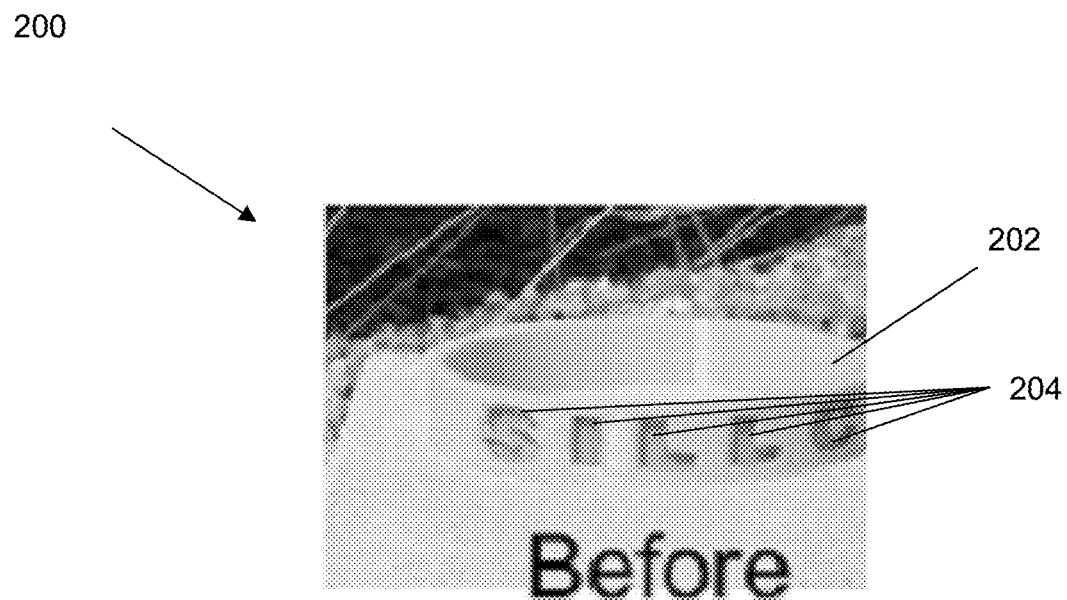
FIGS. 2A-2B show an example bracelet before and after exposure to UV light in accordance with an illustrative embodiment.
Figure 2B:
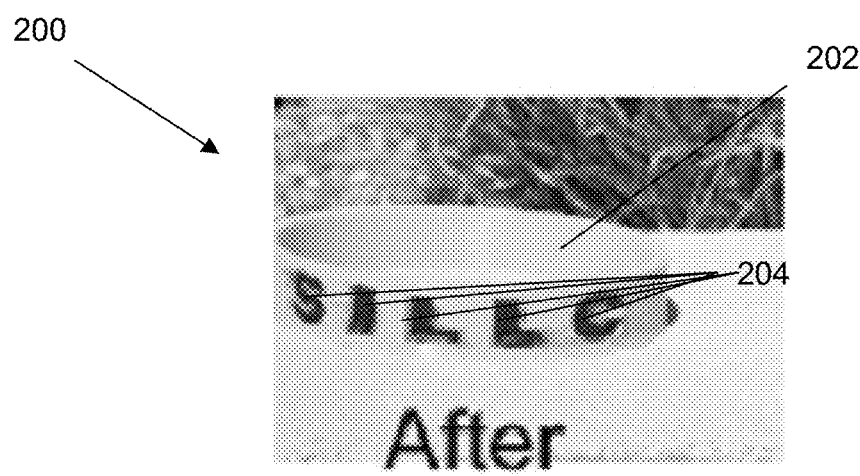

FIGS. 2A-2B show an example bracelet before and after exposure to UV light in accordance with an illustrative embodiment. Bracelet 200 is an example of a wearable apparatus, such as wearable apparatus 100 depicted in FIG. 1. Bracelet 200 includes first material 202 forming bracelet 200 with second material 204 of UV sensitive color-changing material disposed within the first material 202. In an illustrative embodiment, second material 204 forms letters as shown in FIGS. 2A-2B. As shown in FIG. 2A, second material 204 is a first color before exposure to UV light. As shown in FIG. 2B, second material 204 is a second color that is different from the first color after exposure to UV light.

FIGS. 3A-3B show an example bracelet as worn on a user's wrist before and after exposure to UV light in accordance with an illustrative embodiment. Bracelet 300 is an example of a wearable apparatus, such as wearable apparatus 100 depicted in FIG. 1 or bracelet 200 depicted in FIGS. 2A-2B. Bracelet 300 is shown on a user's wrist 302. Bracelet 300 includes first material 304 and second color-changing material 306 that changes color after receiving a threshold amount of UV light. As shown in FIG. 3A, second material 304 is a first color before exposure to UV light and a second color that is different from the first color after exposure to UV light as shown in FIG. 3B.

FIG. 4 is a flowchart of a method for fabricating a wearable apparatus that indicates to a user when a threshold amount of ultra-violet (UV) light has been received by the user in accordance with an illustrative embodiment. Method 400 is an example of a method for fabricating a wearable apparatus, such as, for example, wearable apparatus 100 depicted in FIG. 1, for providing an indication of how much UV light a user has received. Method 400 begins by preparing a first material (operation 402). The first material may be created to be a wearable apparatus, such as a bracelet. In an illustrative embodiment, preparing the first material includes depositing layers of the first material in a layer-by-layer fashion in an additive manufacturing process. Next, a second material is additively deposited into selected portion of the first material (operation 404). Afterwards, method 400 terminates. The second material includes a color changing material that changes color from a first color to a second color when exposed to a threshold level of ultraviolet (UV) light, wherein the wearable apparatus is configured to be worn by a user in a place exposed to sunlight, and wherein the second color indicates that the user has been exposed to a threshold amount of UV light.

Figure 5:
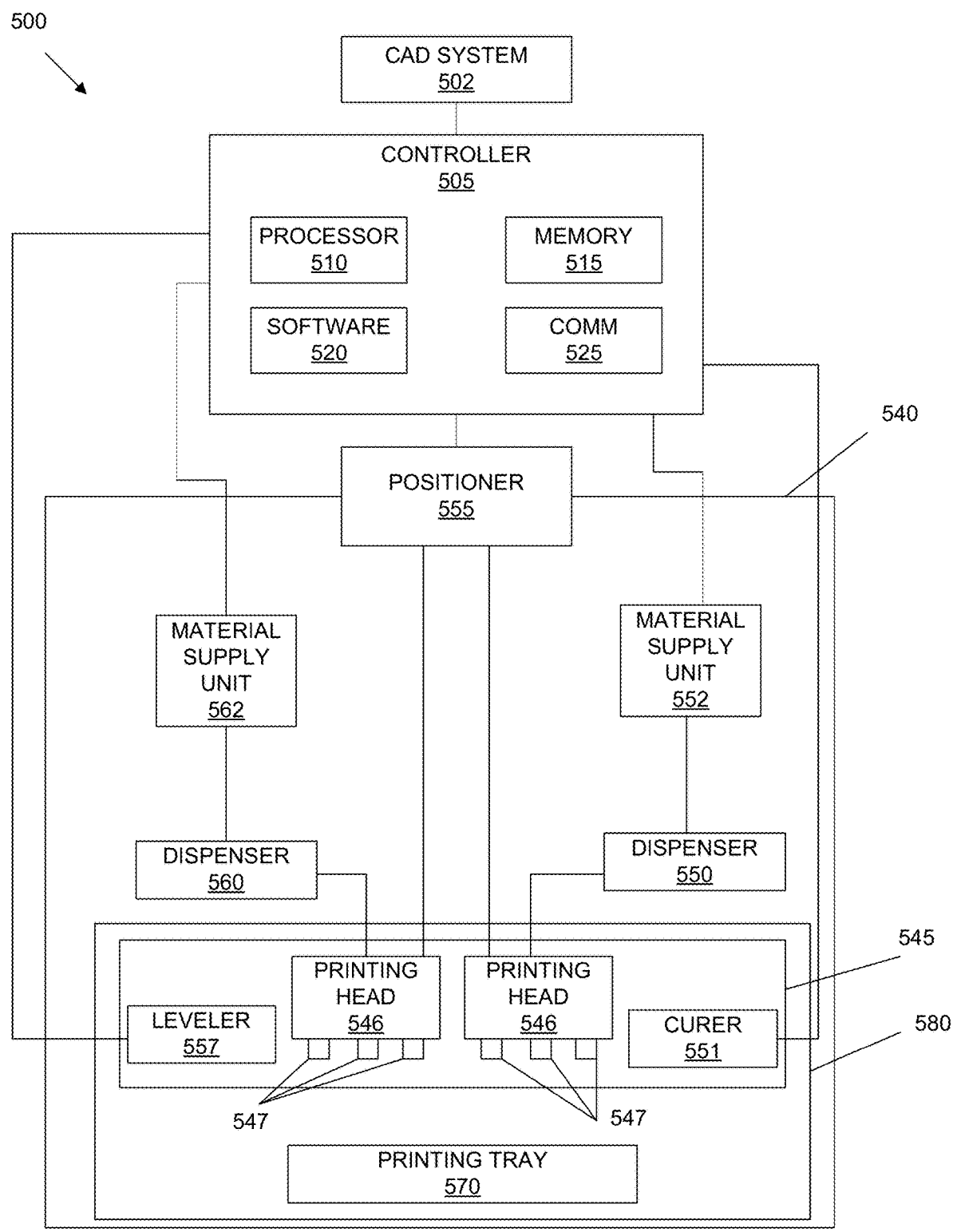
FIG. 5 is a block diagram of a 3D printer system in accordance with an illustrative embodiment.

FIG. 5 is a block diagram of a 3D printer system 500 depicted in accordance with an illustrative embodiment. 3D printer system 500 is an example of an additive manufacturing machine. 3D printer system 500 may implement the methods disclosed herein. 3D printer system 500 may include, for example, a CAD system 502 or other design module, controller 505, and printing apparatus 540.

Controller 505, which may prepare the digital data that characterizes a 3-D object for printing, and control the operation of the printing apparatus, may include, for example, a processor 510, a memory unit 515, software code 520, and a communications unit 525. Other configurations may be used for a controller or control unit. Control functionality may be spread across units, and not all control functionality may be within system 500. For example, a separate unit, such as a personal computer or workstation, or a processing unit within a supply source such as a cartridge may provide some control or data storage capability. Communications unit 525 may, for example, enable transfer of data and instructions between controller 505 and/or CAD system 502, between controller 505 and printing apparatus 540, and/or between controller 505 and other system elements. Controller 505 may be suitably coupled and/or connected to various components of printing apparatus 540.

Printing apparatus 540 may include for example positioner(s) 555, material dispenser(s) 550, 560, material supply unit(s) 552, 562, and printing sub-system 580. Printing sub-system 580 may include a printing box 545, and a printing tray 570. Printing box 545 may include printing head(s) 546, printing nozzle(s) 547, leveler(s) 557, curer(s) 551, and other suitable components. Positioner 555, or other suitable movement devices, may control the movement of printing head 545. Leveler or leveling device 557 may include, for example, a roller or blade or other suitable leveling mechanism. Printing head 545 may be, for example, an ink jet head or other suitable printing head.

Controller 505 may utilize Computer Object Data (COD) representing an object or a model, for example, CAD data in STL format. Controller 505 may also utilize optimized data from optimizer 501. Other data types or formats may be used. Controller 505 may convert such data to instructions for the various units within 3D printer system 500 to print a 3D object. Controller 505 may be located inside printing apparatus 540 or outside of printing apparatus 540. Controller 505 may be located outside of printing system 500 and may communicate with printing system 500, for example, over a wire and/or using wireless communications. In some embodiments, controller 505 may include a CAD system or other suitable design system. In alternate embodiments, controller 505 may be partially external to 3D printer system 500. For example, an external control or processing unit (e.g., a personal computer, workstation, computing platform, or other processing device) may provide some or all of the printing system control capability.

In some embodiments, a printing file or other collection of print data may be prepared and/or provided and/or programmed, for example, by a computing platform connected to 3D printer system 500. The printing file may be used to determine, for example, the order and configuration of deposition of building material via, for example, movement of and activation and/or non-activation of one or more nozzles 547 of printing head 545, according to the 3D object to be built.

Controller 505 may be implemented using any suitable combination of hardware and/or software. In some embodiments, controller 505 may include, for example, a processor 510, a memory 515, and software or operating instructions 520. Processor 510 may include conventional devices, such as a Central Processing Unit (CPU), a microprocessor, a "computer on a chip", a micro controller, etc. Memory 515 may include conventional devices such as Random Access Memory (RAM), Read-Only Memory (ROM), or other storage devices, and may include mass storage, such as a CD-ROM or a hard disk. Controller 505 may be included within, or may include, a computing device such as a personal computer, a desktop computer, a mobile computer, a laptop computer, a server computer, or workstation (and thus part or all of the functionality of controller 505 may be external to 3D printer system 500). Controller 505 may be of other configurations, and may include other suitable components.

According to some embodiments of the present invention, material supply unit(s) 552, 562 may supply building materials to printing apparatus 540. Building materials may include any suitable kind of object building material, such as, for example, photopolymers, wax, powders, plastics, metals, and may include modeling material, support material and/or release material, or any alternative material types or combinations of material types. In some embodiments of the present invention, the building materials used for construction of the 3D object are in a liquid form. In an exemplary embodiment, the modeling and/or support materials used are photopolymers that may contain material curable by electromagnetic radiation and/or electron beams etc. The materials may come in different forms, textures, colors, etc. Other suitable materials or combinations of materials may be used.

3D printer system 500 is an example of an additive manufacturing device that may be used to implement the method 400 depicted in FIG. 4 to fabricate a wearable apparatus that indicates to a user when a threshold amount of ultra-violet (UV) light has been received by the user.

Figure 6:
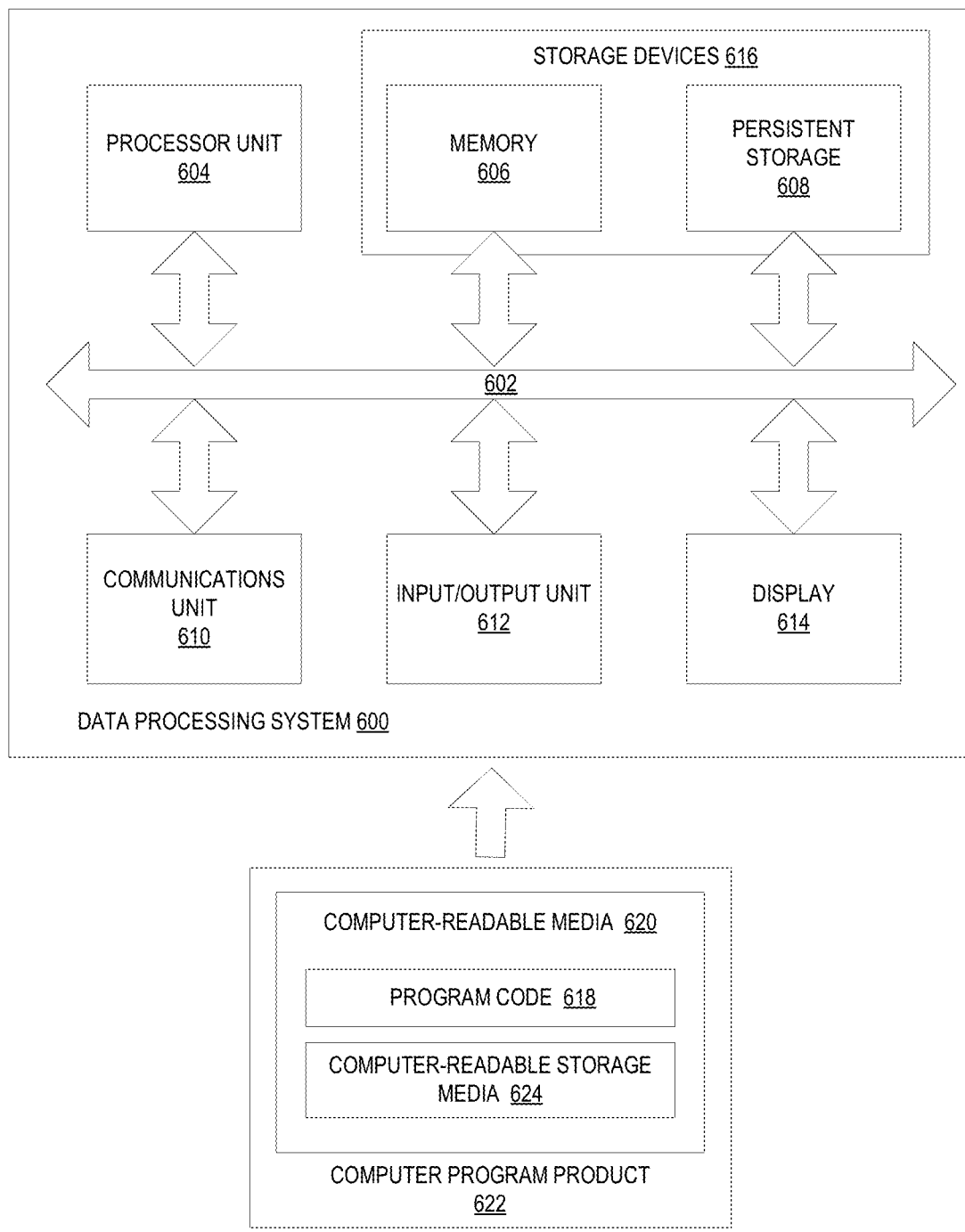
FIG. 6 is a block diagram of a data processing system in accordance with an illustrative embodiment.

Turning now to FIG. 6, a block diagram of a data processing system is depicted in accordance with an illustrative embodiment. Data processing system 600 may be used with CAD System 502 and/or controller 505. In an embodiment, data processing system 600 is a massively parallel processing (MPP) data processor with multiple processors.

In this illustrative example, data processing system 600 includes communications framework 602, which provides communications between processor unit 604, memory 606, persistent storage 608, communications unit 610, input/output (I/O) unit 612, and display 614. In this example, communications framework 602 may take the form of a bus system.

Processor unit 604 serves to execute instructions for software that may be loaded into memory 606. Processor unit 604 may be a number of processors, a multi-processor core, or some other type of processor, depending on the particular implementation.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, may be, for example, a random-access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a solid-state drive (SSD), a flash memory, a rewritable optical disk, a rewritable magnetic tape, or some combination of the above. The media used by persistent storage 608 also may be removable. For example, a removable hard drive may be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that may be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs may be located in storage devices 616, which are in communication with processor unit 604 through communications framework 602. The processes of the different embodiments may be performed by processor unit 604 using computer-implemented instructions, which may be located in a memory, such as memory 606.

These instructions are referred to as program code, computer usable program code, or computer-readable program code that may be read and executed by a processor in processor unit 604. The program code in the different embodiments may be embodied on different physical or computer-readable storage media, such as memory 606 or persistent storage 608.

Program code 618 is located in a functional form on computer-readable media 620 that is selectively removable and may be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 may be transferred to data processing system 600 using a computer-readable signal media. The computer-readable signal media may be, for example, a propagated data signal containing program code 618. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown. The different embodiments may be implemented using any hardware device or system capable of running program code 618.

It should be understood that embodiments discussed herein are not limited to the particular features and processing steps shown. The descriptions provided herein are not intended to encompass all of the steps that may be used. Certain steps that are commonly used are purposefully not described herein for economy of description.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wearable apparatus, comprising:
   a first material; and
   a second material, wherein the second material comprises a color changing material that changes color from a first color to a second color when exposed to a threshold level of ultraviolet (UV) light, wherein the second material comprises a UV sensitive color-changing polymer, wherein the wearable apparatus is configured to be worn by a user in a place exposed to sunlight, and wherein the second color indicates that the user has been exposed to a threshold amount of UV light.

2. The wearable apparatus of claim 1, wherein the second material is configured to stop changing color when the second material has been exposed to the threshold amount of UV light.

3. The wearable apparatus of claim 1, wherein the second material is determined such that the threshold amount of UV light corresponds to a skin-type specific threshold amount of UV light.

4. The wearable apparatus of claim 1, wherein the second color is permanent such that the second material remains at the second color once the second color has been reached.

5. The wearable apparatus of claim 1, wherein the wearable apparatus comprises a bracelet configured to be worn on a user's wrist or ankle.

6. The wearable apparatus of claim 1, wherein the wearable apparatus is disposable.

7. The wearable apparatus of claim 1, wherein the wearable apparatus is water resistant.

8. A method for fabricating a wearable apparatus that indicates to a user when a threshold amount of ultra-violet (UV) light has been received by the user, the method comprising:
   preparing a first material; and
   additively depositing a second material in selected portions of the first material, wherein the second material comprises a color changing material that changes color from a first color to a second color when exposed to a threshold level of ultraviolet (UV) light, wherein the second material comprises a UV sensitive color-changing polymer, wherein the wearable apparatus is configured to be worn by a user in a place exposed to sunlight, and wherein the second color indicates that the user has been exposed to a threshold amount of UV light.

9. The method of claim 8, wherein preparing the first material comprises additively depositing layers of the first material.

10. The method of claim 8, wherein the second material is configured to stop changing color when the second material has been exposed to the threshold amount of UV light.

11. The method of claim 8, wherein the second material is determined such that the threshold amount of UV light corresponds to a skin-type specific threshold amount of UV light.

12. The method of claim 8, wherein the second color is permanent such that the second material remains at the second color once the second color has been reached.

13. The method of claim 8, wherein the wearable apparatus comprises a bracelet configured to be worn on a user's wrist or ankle.

14. The method of claim 8, wherein the wearable apparatus is disposable.

15. The method of claim 8, wherein the wearable apparatus is water resistant.

16. A computer system for fabricating a wearable apparatus that indicates to a user when a threshold amount of ultra-violet (UV) light has been received by the user, the computer system comprising:

a bus system;
a storage device connected to the bus system, wherein the storage device stores program instructions; and
a processor connected to the bus system, wherein the processor executes the program instructions to:
cause an additive printing apparatus to prepare a first material; and
cause the additive printing apparatus to additively deposit a second material in selected portions of the first material, wherein the second material comprises a color changing material that changes color from a first color to a second color when exposed to a threshold level of ultraviolet (UV) light, wherein the wearable apparatus is configured to be worn by a user in a place exposed to sunlight, and wherein the second color indicates that the user has been exposed to a threshold amount of UV light.

17. The system of claim 16, wherein the second color is permanent such that the second material remains at the second color once the second color has been reached.

18. The system of claim 16, wherein the wearable apparatus comprises a bracelet configured to be worn on a user's wrist or ankle.

19. The system of claim 16, wherein the wearable apparatus is disposable.

20. The system of claim 16, wherein the wearable apparatus is water resistant.

* * * * *